June 21, 1932. O. E. OLSON 1,864,211
BOLT
Filed Dec. 2, 1929
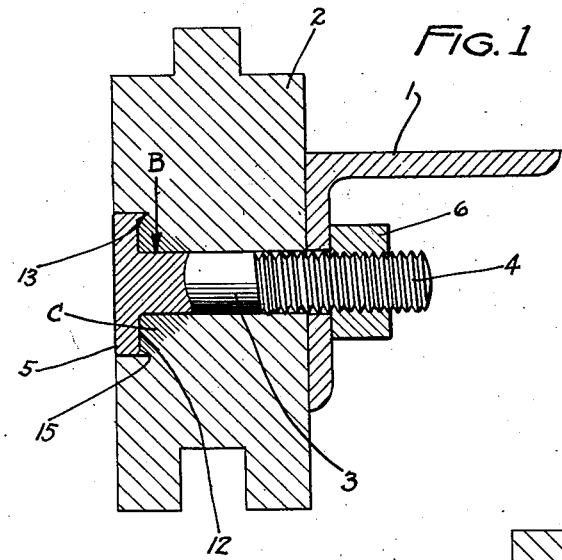
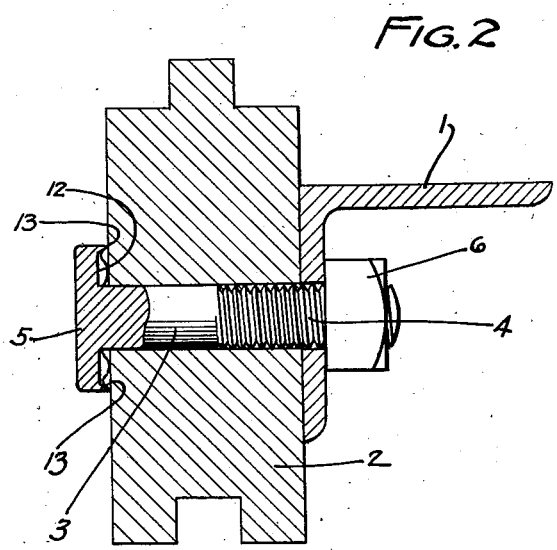
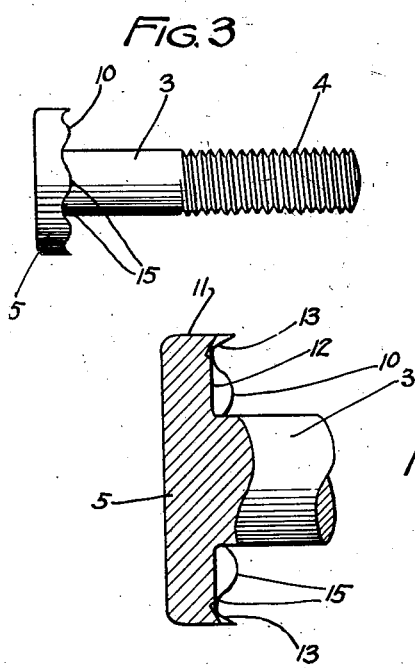
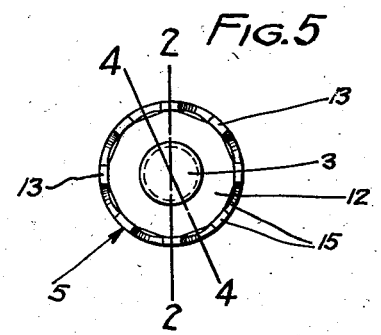
Inventor
OLAF E. OLSON
ATTORNEYS Patented June 21, 1932

1,864,211

UNITED STATES PATENT OFFICE

OLAF E. OLSON, OF ST. PAUL, MINNESOTA

BOLT

Application filed December 2, 1929. Serial No. 411,096.

This invention relates to improvements in bolts particularly adapted for securing wooden elements together or wooden elements to metal or other than wooden elements, and is especially adapted for use in securing wooden elements when the bolt heads must be flush with the outer surfaces of the wooden elements; or when a water tight joint between the wooden elements and the heads of the bolts is desirable. The ordinary "carriage" or wood bolt has a square shank immediately under the head which is designed to prevent the bolt rotating when being drawn tight. Owing to the fact that the area of the square part of the shank is greater than the area of the hole in which the bolt is to be driven, the forcing of this larger area into the wood has a tendency to splitting the wooden elements when bolt is drawn. When desirable that bolt heads be flush with the outer surfaces of the wooden elements it is usually necessary, when using the ordinary "carriage" or wood bolt, after boring the hole for the bolt shank, to then counterbore to form a cavity to receive the head; while this counterboring is satisfactory insofar as countersinking of the head is concerned, a water tight joint cannot be obtained, and, moreover, counterboring weakens the wooden elements and further tends to splitting when the bolt is drawn.

Objects of this invention are, therefore, to provide a type of bolt which will cut its way into the wood to a counter-sunk position with its end surface flush with the wooden element, and which in so doing will compress the wood about the shank and the bolt and thus form a water-tight joint. Another object is to provide a peripheral cutting edge for the head of the bolt, so formed that the bolt will not rotate when being drawn. Another object is to provide a device of the nature described having a peripheral chisel-like cutting edge with the bevel on that side nearest the shank and therefore arranged to compress the wood about the bolt, as the bolt is drawn, thus making a water-tight joint and minimizing the splitting tendency.

Features of the invention include, along with the broader aspects, all details of construction shown.

Objects, features and advantages will also appear in the description of the drawing forming a part of this application, and in said drawing Figure 1 is a section through a wooden element and the support, showing the element attached to the support by means of my invention;

Figure 2 is a view similar to Figure 1 showing the bolt before being drawn to flush position, the bolt head being in section on a line corresponding to 2—2 of Figure 5;

Figure 3 is a side elevation of the bolt;

Figure 4 is an enlarged section taken on line 4—4 of Figure 5; and

Figure 5 is an inside face view of the head illustrating the wave-like form of the cutting edge.

Numeral 1 indicates a suitable metal support and 2 a wooden element to be attached to the support by the bolt herein. The shank of the bolt is indicated at 3, the threads at 4, the head at 5 and the nut at 6. The inner edge of the head of the bolt is provided with a waved cutting edge generally designated at 10. The outer surface 11 of the head is substantially parallel with the axis of the bolt. The inner surface of the head has a pocket 12 formed therein, and the cutting edge is formed by beveling the peripheral surface of this socket as at 13. This surface 13 with the surface 11 forms what may be termed a chisel-like cutting edge and the beveled surface 13 acting, when the bolt is drawn to the position shown in Figure 1, to cut the material and compress it in direction of the arrow B to form a water-tight joint between the wood and the shank of the bolt. The region of compression has been roughly indicated at C, by more closely spaced section lining, see Figure 1.

A valuable feature of the invention is the formation of wave-like indentations 15 which act to prevent turning of the bolt when the nut 6 is tightened. This formation facilitates the cutting action by providing a plurality of inclined cutting edges and the inside beveling as shown acts, as before stated, to compress the wood about the bolt and minimize the splitting tendency. Moreover, there is no slivering of the wood due to pulling action.

The bolt is formed by forging and can be very cheaply produced. It will be understood that it is not necessary that the bolt head be cylindrical but may be of any preferred shape, inasmuch as rotation is to be avoided, and the cutting action is to be obtained merely by translative motion of the bolt in an axial direction.

One of the valuable features of this invention is the action which compresses the wood, makes a water-tight joint, and prevents slipping, and for this reason the bolt can be used for fastening relatively thin boards, which is not possible with any type of bolt known to me. As is well known, counter-boring tends to weaken the board so that it will split when the bolt is drawn and moreover, as before stated, the joint is not tight and water leakage often takes place from the outside inwardly through shank and counter-bored openings.

Another objection to counter-boring is that it is difficult to control the depth of the counter-bore and this depth control is necessary because the counter-bore should not be made as deep as the thickness of the head, since when the bolt is tightened up the bolt head sinks in too deeply and its outer surface lies inwardly from the corresponding surface of the wooden element, rather than flush with it.

I claim as my invention:

1. A bolt having a shank, and a head having an undulating chisel cutting edge, which completely circumscribes the shank of the bolt and the inclined face of which is opposed to the shank, said shank having threads and a nut threaded thereon as means for axially translating the bolt to obtain cutting action and embedment of the head.

2. A bolt having a shank, and a head having an undulating chisel cutting edge which completely circumscribes the shank, the inclined face of which cutting edge is opposed to the shank, said shank having threads and a nut threaded thereon as means for axially translating the bolt to obtain cutting action and embedment of the head, the depth of the undulations in an axial direction being such as to be completely embedded to prevent entry of moisture thereacross toward the shank.

3. A bolt having a shank, and a head having an undulating chisel cutting edge which completely circumscribes the shank, the inclined face of which cutting edge is opposed to the shank, the depth of the undulations in an axial direction being not greater than the depth of the inclined chisel face, said shank having a nut threaded thereon as means for axially translating the bolt to obtain cutting action and embedment of the head, the shank being so formed that it does not apply expanding pressure to the wall of the opening which is traversed by the shank, rotative motion of the bolt and head being prevented by the undulations as the cutting and embedment proceeds.

4. A device of the class described having a shank and a head, the head having a substantially conical depression at the inner side circumscribing the shank and divergently flared in direction of the shank and having a slanting wall intersecting the outer periphery to form a chisel-like knife-edge, said edge being undulating and the depths of the undulations being not greater than the depth of the conical depression as measured from the plane of the high points of the undulations, which plane is perpendicular to the axis of the shank.

5. A bolt having a shank and a head having an undulating cutting edge which completely circumscribes the shank of the bolt, said shank having threads and a nut threaded thereon as means for axially translating the bolt to obtain cutting action and embedment of the head, rotative motion of the bolt and head being prevented by the undulations as the cutting and embedment proceeds.

In witness whereof, I have hereunto set my hand this 29th day of November, 1929.

OLAF E. OLSON.